UNITED STATES PATENT OFFICE.

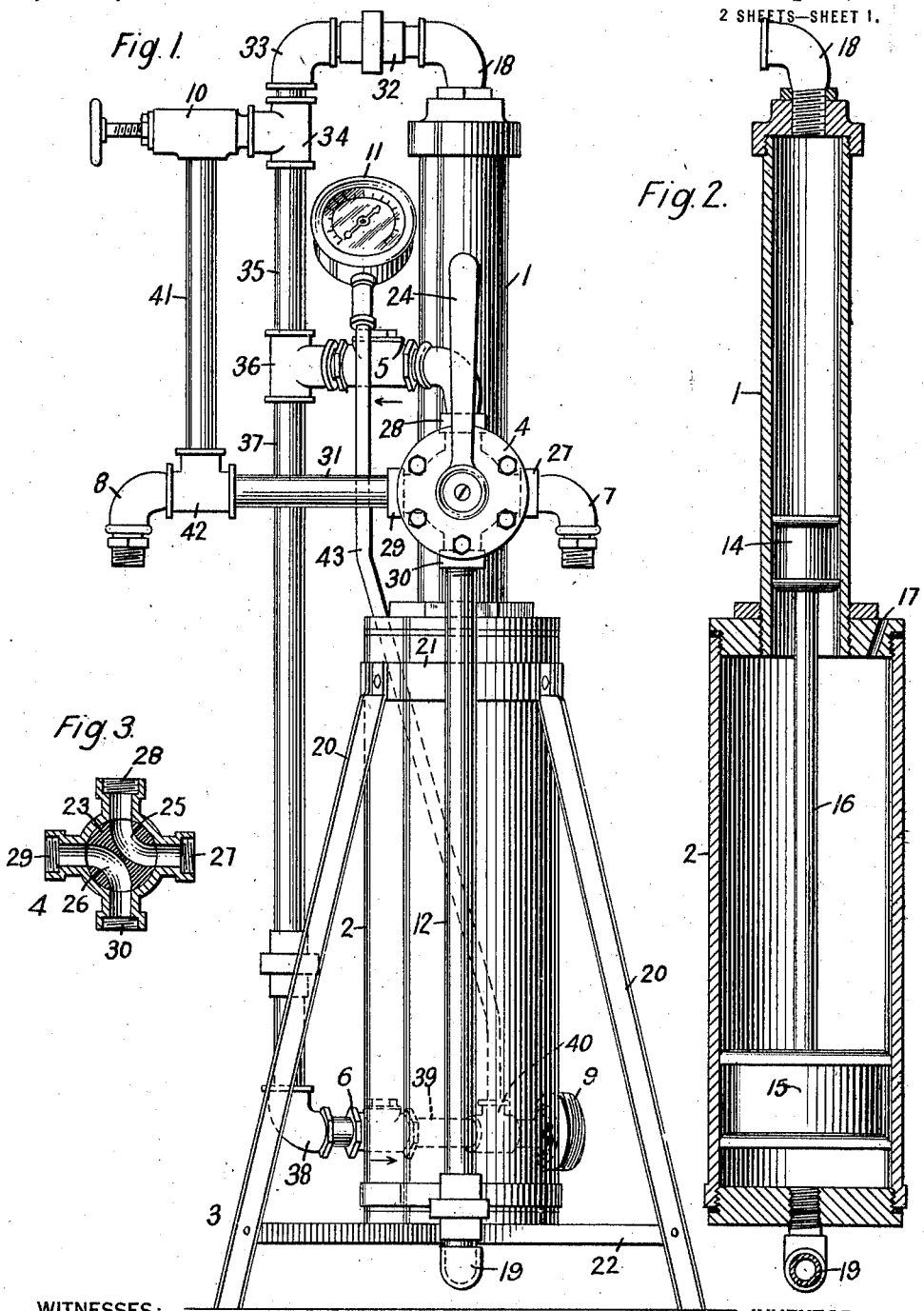

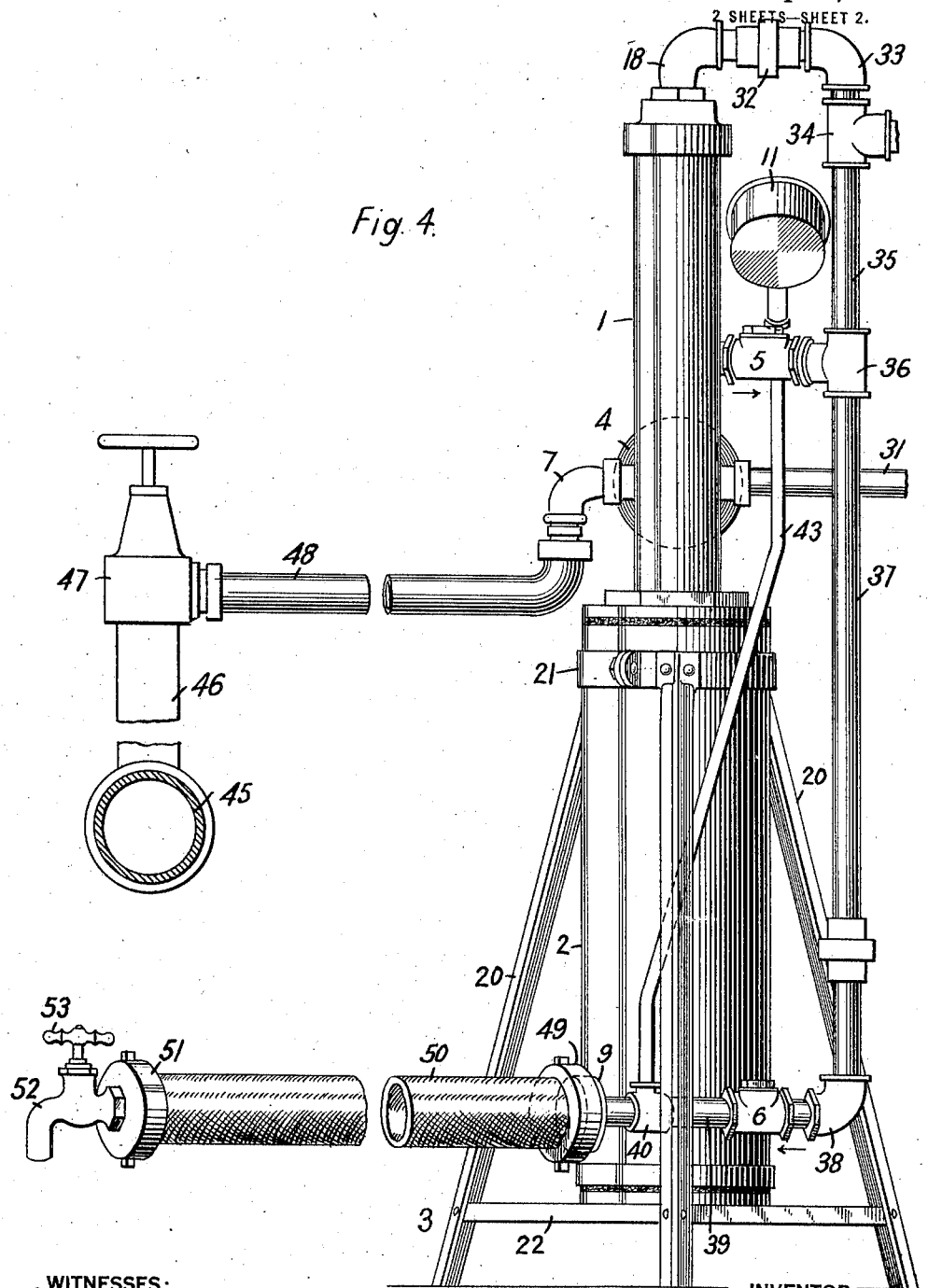

STUART A. NIMS, OF KEENE, NEW HAMPSHIRE; LOUIS A. NIMS ADMINISTRATOR OF SAID STUART A. NIMS, DECEASED.

HOSE-TESTING DEVICE.

1,315,325.     Specification of Letters Patent.     Patented Sept. 9, 1919.

Application filed September 18, 1916. Serial No. 120,664.

*To all whom it may concern:*

Be it known that I, STUART A. NIMS, a citizen of the United States, and a resident of Keene, in the county of Cheshire and State of New Hampshire, have invented a new and useful Improvement in Hose-Testing Devices, of which the following is a specification.

My invention relates to devices employing fluid-pressure and especially to variable-pressure apparatus for testing fire-hose and the like.

One object of my invention is to provide a device of the above-indicated character which shall admit of the application of pressure to a hose or other member to be tested at a predetermined normal value, such as that of city water pressure, or for varying the pressure to a certain degree, and which shall permit the retention of successive increments of pressure within predetermined limits.

Another object of my invention is to provide, in an apparatus of the class under consideration, a valve member for applying fluid at normal pressure to the hose to be tested when occupying one position and for effecting a variation of applied pressure when occupying another position, and a check valve or its equivalent for preventing a return flow of fluid to the valve member, under predetermined conditions.

A further object of my invention is to provide a hose-testing device which shall be relatively simple and inexpensive in construction and effective and reliable in operation, and which, moreover, shall present a neat and compact appearance and shall be readily portable.

My invention may best be understood by reference to the accompanying drawings, wherein Figure 1 is a view in front elevation of a hose-testing device constructed in accordance with my present invention; Fig. 2 is a longitudinal sectional view of a portion of the apparatus that is shown in Fig. 1; Fig. 3 is a sectional view of a valve member that is illustrated in Fig. 1; and Fig. 4 is a view in rear elevation of my hose-testing device, together with the necessary connections to a city water main and to the hose or other device to be tested.

Referring to the drawings, the apparatus shown comprises a hollow cylinder 1 of relatively small diameter; a second hollow cylinder 2 of materially larger diameter which is alined with respect to the cylinder 1 and may be secured thereto in any suitable manner to provide a rigid construction; a suitable supporting stand or tripod apparatus 3 that is associated with the larger cylinder 2 in a manner to be described; a four-way valve member 4 for governing the operation of the apparatus in general; a plurality of check-valves or other equivalent devices 5 and 6 that are located in the piping connections in a manner to be set forth; an inlet pipe or passage 7 and an exhaust outlet pipe or passage 8 between which the four-way valve member 4 is located; a hose-connecting or application outlet 9 to which the member to be tested is suitably secured; a relief valve 10 for the familiar purpose of preventing the occurrence of an excessive pressure in the apparatus; and an indicating device 11 for registering the pressure applied to the member undergoing test.

The smaller cylinder 1 is shown as located vertically above the other cylinder 2, and the axes of the two cylinders are in substantial alinement, as previously mentioned. Suitable pistons 14 and 15 for the smaller and larger cylinders 1 and 2, respectively, are rigidly connected by a stem or rod 16. The pistons thus act as a unitary member.

For the purpose of draining any liquid which may leak into the space between the pistons, a suitable vent-hole 17 is provided in the upper end of the larger cylinder 2. Suitable elbows or passages 18 and 19 are associated with the upper and lower ends, respectively, of the cylinders 1 and 2 and are connected to the remainder of the piping system in a manner to be described.

The supporting stand 3 may conveniently comprise a plurality of angle members 20, the upper ends of which are suitably secured to a band 21 that surrounds the larger cylinder 2 near its upper end, and which members converge outwardly to form a stable supporting means, the various members 20 being also connected, near their lower ends, by means of tie-pieces 22 which are suitably bent to pass beneath the larger cylinder 2 and thus act as an additional support therefor. It will be understood that any other suitable arrangements for supporting the device as a whole may be utilized: for example, the apparatus may be disposed in a horizontal position and suitable supporting means therefor be provided, if desired.

The valve member 4 is of a familiar four-way type, as best illustrated in Fig. 3, and comprises a movable internal member 23, provided with an exterior handle 24, and having a plurality of suitably curved internal passages 25 and 26 for registering with, and effecting communication between, adjacent pairs of inlets or outlets 27, 28, 29 and 30, which are disposed substantially 90 degrees apart around the circumference of the valve member, in accordance with a familiar construction.

A piping connection from the upper end of the smaller cylinder 1 comprises the elbow 18, a union 32, elbow 33, T-connection 34 with which the valve 10 is associated, pipe 35, T-connection 36 which communicates with the check valve 5, pipe 37, elbow 38, check valve 6, pipe 39, T-connection 40 to which the indicator 11 leads, and the hose-connecting outlet 9.

The lower end of the larger cylinder 2 is connected through the elbow 19 and a pipe 12 to the outlet opening 30 of the four-way valve member 4.

The check valves 5 and 6 may be of any familiar construction and are adapted to permit of the flow of liquid only in the directions indicated by the respective arrows, for purposes to be described. The check valve 5 is disposed between the outlet opening 28 of the four-way valve member 4 and the T-connection 36.

Thus, in the illustrated position of the valve member 4, communication is established from the main inlet 7 through the passage 25 of the four-way valve, the check valve 5, beyond which the communication divides, one branch leading to the upper end of the smaller cylinder 1 and the other branch leading through the check valve 6 to the hose-connecting outlet 9, as previously described.

The main inlet pipe or passage 7 is shown as directly connected to the inlet opening 27 of the four-way valve member, whereas a pipe 31 is disposed intermediate the opposite outlet opening 29 and the exhaust pipe or passage 8.

The hose-connecting outlet 9 is screw-threaded and of a size suitable to receive the usual end-connection of the type of fire-hose or other member to be tested.

The water-relief valve 10 is not essential to the successful operation of my hose-testing device, but is merely a safety appliance and may be of any familiar form for effecting the intended function. One opening of the valve 10 communicates with the T-connection 34, while the other opening is connected through a pipe 41 to a T-connection 42 that is located adjacent to the main exhaust outlet 8.

The indicating device 11 may be of the well-known Bourdon gage type, or its equivalent, and is connected through a suitable pipe 43 to the T-connection 40, thus serving to register the pressure applied to the hose-connecting outlet 9.

In Fig. 4, a pipe 45, which represents a city main or other suitable source of fluid pressure, is shown as connected through a pipe 46, a gate-valve or its equivalent 47, and a pipe 48 to the main inlet 7. It is evident that any other suitable arrangement for conducting fluid to the inlet 7 may be employed, if desired.

A screw-threaded bushing or ring 49 of a familiar type that is disposed upon one end of the fire-hose 50, is screwed on the hose-connecting outlet 9, while a special cap member 51 having a spigot or tap 52 is threaded upon the opposite end of the fire hose. The spigot is provided with the usual operating handle 53, which normally occupies the position that corresponds to the closure of the spigot.

Assuming that the various parts of the apparatus occupy the respective positions shown and that the fire-hose 50 and the cap member 51 are connected to the testing device in the manner described, the fire-hose may be tested in the following manner.

The gate-valve 47 is opened to admit city water from the main 45 to the inlet 7, whereupon the liquid flows through the passage 25 of the four-way valve 4 and the check valve 5 to the T-connection 36, where the stream divides, one branch flowing through the pipe 35 to the upper end of the smaller cylinder 1, thereby admitting a filling quantity of liquid to the cylinder, and the other branch flowing through the pipe 37 and the check valve 6 to the hose-connecting outlet 9, whereby a filling quantity of liquid is also admitted to the fire-hose 50, which is thus subjected to the normal pressure of the city water, inasmuch as the spigot 52 is tightly closed.

The handle 24 of the four-way valve 4 is then given a quarter-turn in either direction, whereby the main inlet 7 is placed in communication with the pipe 12 to thus admit a filling quantity of liquid to the larger cylinder 2. Since the piston 15 is materially larger than the piston 14, the rigidly connected pistons are gradually forced upwardly by reason of the greater total pressure in the cylinder 2, the fluid being expelled from the smaller cylinder 1 through the elbow 18, the pipes 35 and 37 and the check valve 6, in accordance with the previously traced piping connection, to the hose-connecting outlet 9, whereby a predetermined quantity of water is forced into the fire-hose to increase the pressure applied thereto, which increased pressure is maintained in the fire-hose by reason of the fact that return communication of the hose with the remainder of the system is prevented by the check valve 6. Furthermore, the return flow of the fluid expelled from the smaller cylinder 1 to the four-way valve member 4 is prevented by the action of the other check valve 5, as will be understood.

If one stroke of the piston and the consequent entry of a predetermined volume of liquid to the fire-hose 50, is insufficient to increase the pressure therein to the desired amount, owing to the expansion of the hose, then the four-way valve 4 may be returned to its first or illustrated position, thus causing the piston member 14 to be downwardly actuated to the position shown, by reason of the admission of liquid to the smaller cylinder 1, the liquid in the larger cylinder 2 being expelled through the pipe 12 and the corresponding passage of the four-way valve 4 to the exhaust outlet 8. A quarter-turn of the four-way valve member then again causes the above-mentioned admission of liquid to the larger cylinder 2 and the expulsion of a predetermined quantity of water from the smaller cylinder 1 into the fire-hose to further increase the applied pressure. By repeating the above-described manipulation of the four-way valve member 4, the successive entrance of predetermined quantities of liquid to the fire-hose 50 may be effected until the desired testing pressure, as indicated by the gage 11, is attained. It will be understood that the maximum pressure that can be applied to the fire-hose is equal to the product of the normal city water pressure and the ratio of areas of the pistons 15 and 14. For example, if the ratio of the effective areas of the pistons 15 and 14 is as four to one, that is, if the diameter of the piston 15 is twice that of the piston 14, and assuming that the city water pressure equals 100 pounds per square inch, then the maximum pressure that can be applied to the fire-hose equals 400 pounds per square inch, since at that pressure value, conditions throughout the testing device will be balanced and no further quantity of liquid can be forced into the fire-hose.

Obviously, the ratio of areas of the pistons 15 and 14 may be chosen to suit any desired conditions, for example, the hose-testing device may be designed to raise the normal city water pressure, of whatever value, to approximately 200 pounds per square inch upon a single stroke of the piston, such pressure being the usual testing value in the case of single fifty-foot lengths of fire-hose of 2½″ diameter.

After the completion of the test, the gate-valve 47 may be closed, or preferably the four-way valve 4 is given a one-eighth turn, to shut off the water supply. The spigot 52 is next opened to allow the liquid from the fire hose to drain. A new length of hose may then be placed between the hose-connecting outlet 9 and the closed cap member 51, whereupon the hose-testing device is available for another test.

Should the pistons 15 and 14 occupy any position, other than that shown, at the beginning of a test, it will be understood that admission of liquid to the smaller cylinder 1 under the above-described initial operating conditions will immediately actuate the pistons to the illustrated positions and subsequent operation conforms to that already described.

Obviously, either the above-described inlet pipe 7 of the exhaust outlet pipe 8 may be employed to conduct fluid from the city mains to the four-way valve member 4, and such choice of inlet will determine the position of the four-way valve member with respect to the application of normal pressure or increased pressure to the fire-hose. I do not wish to be restricted to the specific structural details or arrangement of parts herein set forth, as various modifications thereof may be effected without departing from the spirit and scope of my invention. I desire, therefore, that only such limitations shall be imposed as are indicated in the appended claims.

I claim as my invention:

1. In a device employing fluid-pressure, the combination with means for applying pressure to a member at normal value or for varying said pressure to a predetermined degree, of means independent of said applying means for retaining the pressure applied to said member.

2. In a device employing fluid-pressure, the combination with a receiving member, of means dependent upon its position for applying pressure to said member of materially different values, and one way valve means for retaining the pressures successively applied to said member, whereby the total applied pressure may be increased at will by the repeated manipulation of said applying means.

3. In a fluid-pressure hose-testing device, the combination with means for effecting the successive entrance of predetermined quantities of fluid to a hose, of means for retaining said quantities irrespective of said first means.

4. In a fluid-pressure hose-testing device, the combination with means for effecting the successive entrance of an initial filling quantity of fluid to a hose and the entrance of successive increments at will, of independent means for retaining said increments in the hose.

5. In a fluid-pressure hose-testing device, the combination with a plurality of differently-sized operating cylinders, of rigidly-connected pistons respectively adapted to travel therein, a valve member for initially admitting filling quantities of fluid to a hose and to a relatively small cylinder and for subsequently admitting a filling quantity of fluid to a larger cylinder to expel fluid from said relatively small cylinder into said hose, and means for retaining successive increments of expelled fluid in said hose as said valve member is repeatedly manipulated.

6. In a fluid-pressure hose-testing device, the combination with a pair of operating cylinders of materially different size, of rigidly-connected pistons respectively adapted to travel therein, a valve member, for initially admitting filling quantities of fluid to a hose and to the smaller cylinder, means for actuating said valve member to a second position to admit a filling quantity of fluid to the larger cylinder to expel fluid from the smaller cylinder into said hose, means for preventing the flow of fluid from the smaller cylinder to said valve member, and means for preventing the return flow of fluid from said hose, whereby the fluid-pressure applied to the hose may be increased at will to a value dependent upon the ratio of areas of said pistons by the repeated manipulation of said valve member to cause the successive expulsions of fluid from the smaller cylinder to the hose.

7. A fluid-pressure device comprising a plurality of differently-sized operating cylinders, rigidly-connected pistons respectively adapted to travel therein, a fluid-pressure inlet, an exhaust outlet, an application outlet, a valve member for initially effecting communication between said inlet and both said application outlet and a relatively small cylinder and for subsequently effecting communications between said inlet and a larger cylinder, and means for preventing return communication of said application outlet with other parts of the device.

8. A fluid-pressure device comprising a pair of operating cylinders of materially different size, rigidly-connected pistons respectively adapted to travel therein, a fluid-pressure inlet, an exhaust outlet, an application outlet, a valve-member for effecting communication, when occupying one position, between said inlet and both said application outlet and the smaller cylinder and also between the larger cylinder and the exhaust outlet, means for actuating said valve member to a second position to effect communication between said inlet and the larger cylinder, means for preventing return communication of the smaller cylinder with said valve member, and means for preventing return communication of said application outlet with other parts of the device.

9. A hose-testing device comprising a pair of alined operating cylinders of materially different size, rigidly-connected pistons respectively adapted to travel therein, an inlet pipe, an exhaust pipe, a hose-connecting outlet, a four-way valve member disposed intermediate the inlet pipe and the exhaust pipe, a piping connection between the smaller cylinder and the hose-connecting outlet, a piping connection embodying a check valve between said valve member and said first piping connection, a second check valve located in said first piping connection near the hose-connecting outlet, and a piping connection between the valve member and the larger cylinder.

10. In a device employing fluid pressure, the combination with a single fluid source, of movable means for applying fluid at normal pressure to a member when occupying one position and for effecting a variation of applied pressure when occupying another position, and means for preventing a return flow of fluid to said movable means under predetermined conditions.

11. In a hose-testing device, the combination with a single fluid source, of means dependent upon its position for applying pressure to a hose of materially different values, and means for preventing a return flow of fluid to said applying means irrespective of the position thereof.

12. In a hose-testing device, the combination with a single-fluid source, of a plurality of differently-sized operating cylinders, rigidly-connected pistons respectively adapted to travel therein, a valve member for initially admitting filling quantities of fluid to a hose and to a relatively small cylinder and for subsequently admitting a filling quantity of fluid to a larger cylinder to expel fluid from said relatively small cylinder into said hose, and means for preventing the flow of fluid from said small cylinder to said valve member.

13. In a hose-testing device, the combination with a single fluid source, of a pair of operating cylinders of materially different size, rigidly-connected pistons respectively adapted to travel therein, a valve member for initially admitting filling quantities of fluid to a hose and to the smaller cylinder, means for actuating said valve member to a second position to admit a filling quantity of fluid to the larger cylinder to expel fluid from the smaller cylinder into said hose, and means for preventing the flow of fluid from the smaller cylinder to said valve member.

14. A fluid-pressure device comprising a plurality of differently-sized operating cylinders, rigidly-connected pistons respectively adapted to travel therein, a fluid-pressure inlet, an exhaust outlet, an application outlet, a valve member for initially effecting communication between said inlet and both said application outlet and a relatively small cylinder and for subsequently effecting communication between said inlet and a larger cylinder, and means for preventing return communication of said small cylinder with said valve member.

15. A fluid-pressure device comprising a pair of operating cylinders of materially different size, rigidly-connected pistons respectively adapted to travel therein, a fluid-pressure inlet, an exhaust outlet, an application outlet, a valve-member for effecting communication when occupying one position, between said inlet and both said application outlet and the smaller cylinder and also between the larger cylinder and the exhaust outlet, means for actuating said valve member to a second position to effect communication between said inlet and the larger cylinder, and means for preventing return communication of the smaller cylinder with said valve member.

16. A fluid-pressure device comprising a pair of alined operating cylinders of materially different size, rigidly-connected pistons respectively adapted to travel therein, an inlet member, an exhaust member, an outlet member, a four-way valve member disposed intermediate the inlet member and the exhaust member, a one-way valve located intermediate said four-way valve member and the smaller cylinder, and a second one-way valve located intermediate said four-way valve member and said outlet member.

17. A fluid-pressure device comprising a pair of alined operating cylinders of materially different size, rigidly-connected pistons respectively adapted to travel therein, an inlet member, an exhaust member, an outlet member, a four-way valve member disposed intermediate the inlet member and the exhaust member, a one-way valve located intermediate said four-way valve member and the smaller cylinder, and a second one-way valve located intermediate said four-way valve member and said outlet member, both of said one-way valves opening away from said four-way valve member.

18. A fluid-pressure device comprising a pair of alined operating cylinders of materially different size, rigidly-connected pistons respectively adapted to travel therein, an inlet member, an exhaust member, an outlet member, a four-way valve member disposed intermediate the inlet member and the exhaust member, and a one-way valve located intermediate said four-way valve member and said outlet member and opening away from the four-way valve member.

19. A fluid-pressure device comprising a pair of alined operating cylinders of materially different size, rigidly-connected pistons respectively adapted to travel therein, an inlet member, an exhaust member, an outlet member, a four-way valve member disposed intermediate the inlet member and the exhaust member, and a one-way valve located intermediate said four-way valve member and the smaller cylinder and opening away from the four-way valve member.

In testimony whereof, I have hereunto subscribed my name this 9th day of September 1916.

STUART A. NIMS.

Copies of this patent may be obtained for five cents each, by addressing the "Commissioner of Patents, Washington, D. C."